H. A. J. DINEEN.
VALVE FOR HYDRAULIC PRESSES.
APPLICATION FILED MAY 10, 1922.

1,431,101.

Patented Oct. 3, 1922.

Inventor
H.A.J. Dineen,
By Marks&Clerk
Attys.

Patented Oct. 3, 1922.

1,431,101

UNITED STATES PATENT OFFICE.

HUBERT ARTHUR JAMES DINEEN, OF THORNBURY, VICTORIA, AUSTRALIA.

VALVE FOR HYDRAULIC PRESSES.

Application filed May 10, 1922. Serial No. 559,953.

*To all whom it may concern:*

Be it known that I, HUBERT ARTHUR JAMES DINEEN, a subject of the King of Great Britain, residing at Thornbury, in the State of Victoria and Commonwealth of Australia, have invented new and useful Improvements in Valves for Hydraulic Presses (for which I have filed an application in Australia April 12, 1921), of which the following is a specification.

At the present time in the case of valves for hydraulic presses, where two pressures of water, one high and one low, are used, it is necessary to use a check valve in the supply mains, special precautions have to be taken to balance the valve, and, when the valves are worn, considerable expense is entailed in repairs.

According to this invention, no check valve is required, as moving parts being subjected to no pressure tending to cause excessive friction between rubbing faces, gives the equivalent of a perfectly balanced valve, and all wear is taken by cup leathers which may be easily and cheaply renewed.

Referring to the drawings hereto annexed:—

Figure 1:
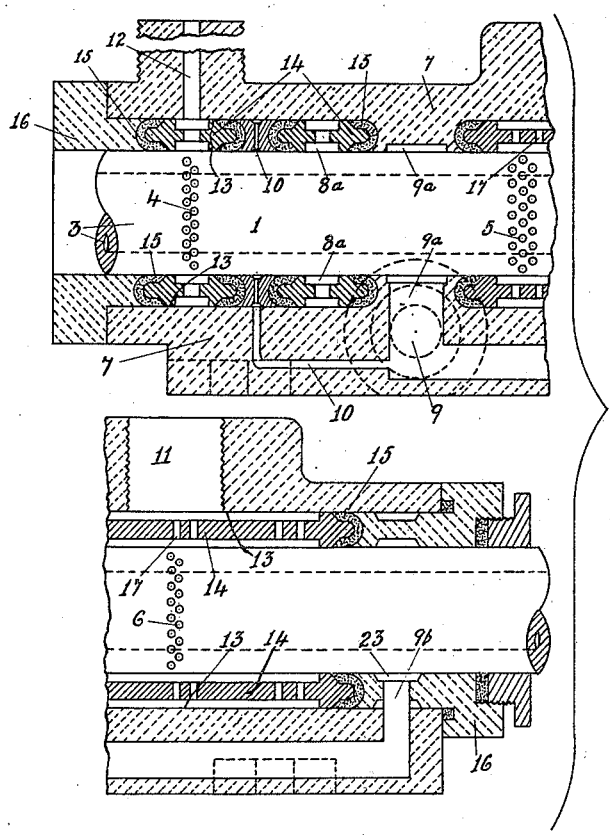
Figure 1 is a longitudinal section of a valve for hydraulic presses constructed according to my invention, the section being taken in a plane intersecting the high pressure water inlet opening.
Figure 2:
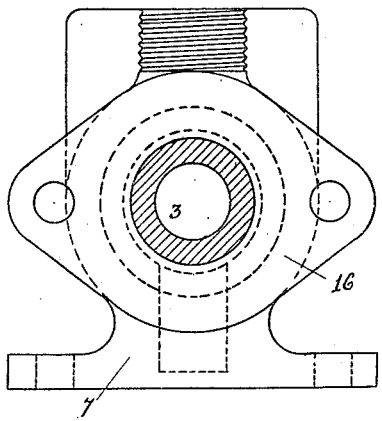
Fig. 2 is an end elevation of the valve, the plunger being shown in section.
Figure 3:
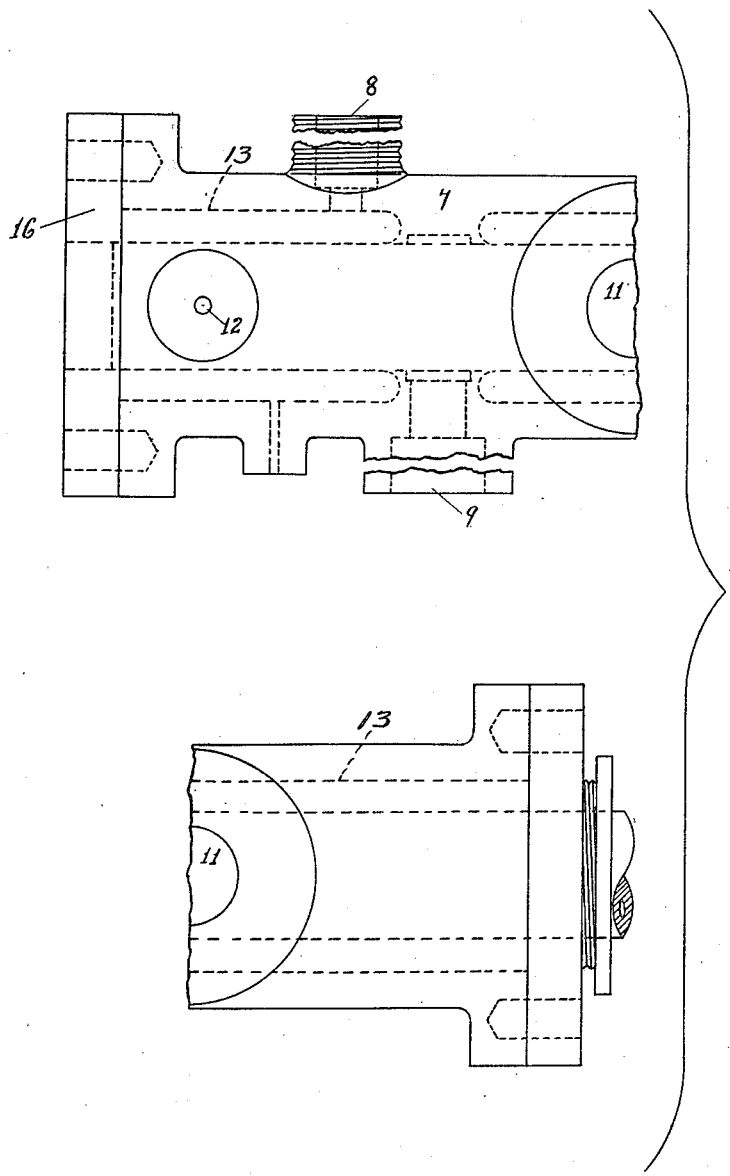
Fig. 3 is a side elevation of the valve.
Figure 4:
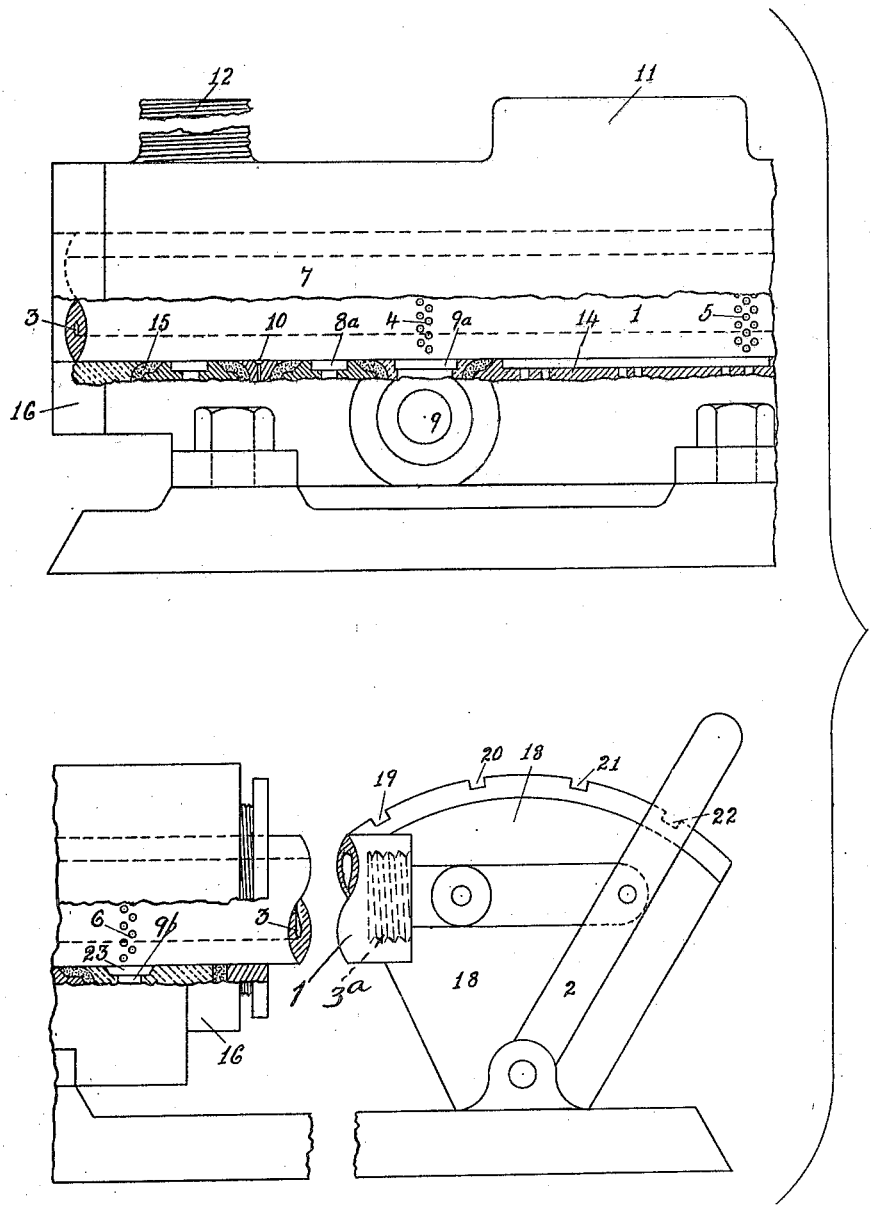
Fig. 4 is a part sectional side elevation of the plunger, and operating lever, when the valve is in its exhaust position.

The valve, which can be used in either a horizontal or vertical position, consists of a cylindrical plunger 1, one end of which is arranged to take the end of an operating lever 2, by means of which a reciprocating motion is capable of being given to said plunger. Said plunger has a circular passage 3 bored and extending axially throughout its whole length. Each end of the said circular passage is closed by a threaded removable plug such as indicated at 3ª in Fig. 4. 4, 5 and 6 are radial holes which extend from the outer circumference of the plunger to the inner circumference of the said passage. As illustrated in Figures 1 and 3 of the drawings, there are three sets of these radial holes. The plunger 1 is contained within a cylindrical metal casing 7 having on one side openings 8ª and 9ª, the former being connected to the low pressure water supply connection 8 and the latter to the exhaust pipe 9, through which latter the water is passed after being used. The casing is further provided with a small opening 10 connected to the exhaust 9 for the purpose of carrying away any water that may leak between the plunger 1 and the cup leathers hereinafter referred to. 11 is an opening connected to the hydraulic press and 12 is another opening connected to the high pressure water supply. 13 are recesses which are formed on the inner diameter of said casing 7, where such openings 11 and 12 are situated, the said recesses being for the purpose of receiving the water from the circular passage 3 of the plunger 1. Between the outer circumference of the plunger 1 and the walls of the recesses 13 are metal rings 14 having between them suitably spaced cup leathers 15, said rings and cup leathers being kept in position within said metal rings by glands 16 at either end of said casing 7. Where these rings 14 come opposite one of the openings, they are recessed for a suitable length and depth on their inner diameter, a number of radial holes 17 being bored through said rings about the centre of said recess 13. The cup leathers 15 are placed on either side of the openings, their rounded portion being away from the opening. The distance between the recesses formed in the rings opposite the various openings is such, (1) that when the set of radial holes 4 in the plunger 1, nearest its end, is opposite the recess adjacent to the low pressure opening 8, the centre set of radial holes 5 in the plunger 1 is in such a position as to allow low pressure water to flow to the press; and (2) that when the plunger 1 is moved until the radial holes 4 in the plunger register with the recess in the ring 14, adjacent to the low pressure water supply opening 8, the other two sets of radial holes 5, 6, in the plunger, are opposite the recess in the ring 14 adjacent to the opening 11, which, as before explained, is connected with the hydraulic press. When the set of radial holes 4 in the plunger 1 nearest its end is opposite the recess in the ring adjacent to the exhaust opening 9ª the set of radial holes 6 (as illustrated in Figure 4) in the plunger 1 at the other end is opposite a recess in a ring 23 adjacent to an exhaust opening 9ᵇ, thus providing a double exhaust. 18 is a quadrant having slots 19, 20, 21 and 22 with which said lever 2 is free to engage.

To operate the valve, the lever, which is normally in engagement with slot 20 in quadrant 18, is moved into engagement with slot 21, so as to bring the radial holes 4 opposite to the opening 8ª when low pressure water flows into the casing 7, and into the circular passage 3 through radial holes 4 and from said passage through radial holes 5 and 6 to the opening 11 leading to the press. On said lever being caused to engage with slot 19, the radial holes 4 are brought opposite the opening 12 connected to the high pressure water supply, through which such high pressure water supply passes by means of said radial holes 4 to the circular passage 3, and therefrom through radial holes 5 and 6 to the press via opening 11. When the press has done its work, the lever is caused to engage with slot 20 in quadrant 18 which results in radial holes 4 being between opening 8ª and opening 12 thus preventing any water flowing into the circular passage 3, and gradually lowering the pressure in the press. The lever is then caused to engage with slot 22 enabling the water to exhaust through holes 4 into opening 9ª and through holes 6 into opening 9ᵇ and from said openings it passes away through exhaust pipe 9.

I claim as my invention:—

1. In a valve for a hydraulic press, a casing having a low pressure water inlet opening, an exhaust opening, an opening adapted for connection with a press and a high pressure water inlet opening, a plunger slidably mounted in said casing having a longitudinal bore extending axially throughout its entire length and having a plurality of groups of radial openings therein communicating with the bore and adapted for communication with the openings in the casing, and means closing the extremities of the bore of the plunger.

2. In a valve for hydraulic presses, a casing having a low pressure water inlet opening, an exhaust opening, an opening adapted for connection with a press and a high pressure water inlet opening, a plunger slidably mounted in said casing having a bore extending axially throughout its entire length and having groups of openings therein adapted to register with the openings in said casing, means closing the extremities of the bore of said plunger, said casing having internal recesses, rings located in said recesses and overlying the openings in said casing, said rings having apertured recessed portions lying contiguous to the openings in the casing for permitting the passage of fluid therethrough, packing elements associated with said rings, and means for retaining the rings and packing elements in position in said recesses.

3. In a valve for hydraulic presses, a casing having a high pressure water inlet opening, an opening adapted for connection with a press, and low pressure water and exhaust openings located between the first and second mentioned openings, a plunger slidably mounted in said casing having a longitudinal bore extending from end to end and provided with three groups of openings movable into registration with the openings of the casing whereby to control communication of the press connected opening with the high and low pressure water openings and the exhaust opening, and means closing the end of the bore of said plunger.

HUBERT ARTHUR JAMES DINEEN.